(12) United States Patent
Bank et al.

(10) Patent No.: US 11,222,029 B2
(45) Date of Patent: Jan. 11, 2022

(54) PRIORITIZING ITEMS BASED ON USER ACTIVITY

(71) Applicant: Airbnb, Inc., San Francisco, CA (US)

(72) Inventors: Judith H. Bank, Wake, NC (US); Liam Harpur, Dublin (IE); Ruthie D. Lyle, Durham, NC (US); Patrick J. O'Sullivan, Dublin (IE); Lin Sun, Cary, NC (US)

(73) Assignee: Airbnb, Inc., San Francisco, CA (US)

( * ) Notice: Subject to any disclaimer, the term of this patent is extended or adjusted under 35 U.S.C. 154(b) by 227 days.

(21) Appl. No.: 16/413,934

(22) Filed: May 16, 2019

(65) Prior Publication Data

US 2019/0272276 A1 Sep. 5, 2019

Related U.S. Application Data (63) Continuation of application No. 13/841,955, filed on Mar. 15, 2013, now Pat. No. 10,394,825.

(51) Int. Cl.
| | | |
|---|---|---|
| *G06F 16/20* | (2019.01) | |
| *G06F 16/2457* | (2019.01) | |
| *G06F 16/335* | (2019.01) | |
| *G06F 16/9038* | (2019.01) | |
| *G06F 16/9535* | (2019.01) | |

(52) U.S. Cl.
CPC ...... *G06F 16/24578* (2019.01); *G06F 16/335* (2019.01); *G06F 16/9038* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 6,006,225 A | 12/1999 | Bowman | |
| 6,654,735 B1 | 11/2003 | Eichstaedt et al. | |
| 8,386,728 B1 | 2/2013 | Ionescu | |
| 8,600,969 B2* | 12/2013 | Sim | G06F 16/9535 |
| | | | 707/706 |
| 8,700,623 B2 | 4/2014 | Fay | |
| 9,076,154 B1* | 7/2015 | Song | G06Q 30/02 |
| 9,298,721 B2 | 3/2016 | Boyer | |
| 9,785,341 B2 | 10/2017 | Stallings | |
| 9,875,285 B2 | 1/2018 | Bank et al. | |
| 10,394,825 B2 | 8/2019 | Bank et al. | |
| 10,936,602 B2 | 3/2021 | Bank et al. | |
| 2003/0154180 A1* | 8/2003 | Case | G06Q 30/02 |
| 2007/0156636 A1* | 7/2007 | Norton | G06F 16/907 |
| 2009/0276771 A1 | 11/2009 | Nickolov | |

(Continued)

FOREIGN PATENT DOCUMENTS

WO 2012000169 A1 1/2012

OTHER PUBLICATIONS

"U.S. Appl. No. 15/803,270, Non Final Office Action dated May 1, 2020", 10 pgs.

(Continued)

*Primary Examiner* — Belix M Ortiz Ditren
(74) *Attorney, Agent, or Firm* — Schwegmnan Lundberg & Woessner, P.A.

(57) ABSTRACT

Prioritizing items based on user activity includes determining a user interest based on a current user activity and prioritizing items in a list presented in a display based on the user interest.

20 Claims, 4 Drawing Sheets

(56) References Cited

U.S. PATENT DOCUMENTS

| | | |
|---|---|---|
| 2010/0017259 A1 | 1/2010 | Luo |
| 2010/0174578 A1* | 7/2010 | Duffy ................ G06Q 10/10 705/7.14 |
| 2011/0225197 A1 | 9/2011 | Howes |
| 2011/0276921 A1* | 11/2011 | Long .................. G06F 16/9535 715/825 |
| 2012/0210375 A1* | 8/2012 | Wong ................ H04N 21/4126 725/93 |
| 2012/0311131 A1* | 12/2012 | Arrasvuori ........... H04L 63/102 709/224 |
| 2012/0331495 A1 | 12/2012 | Hyun |
| 2014/0280117 A1 | 9/2014 | Bank |
| 2014/0280123 A1 | 9/2014 | Bank et al. |
| 2016/0063127 A1 | 3/2016 | Naveh |
| 2017/0118186 A1 | 4/2017 | Kaipu |
| 2018/0060331 A1 | 3/2018 | Bank et al. |

OTHER PUBLICATIONS

"U.S. Appl. No. 15/803,270, Response filed Jul. 15, 2020 to Non Final Office Action dated May 1, 2020", 14 pgs.

"U.S. Appl. No. 15/803,270, Examiner Interview Summary dated May 29, 2020", 3 pgs.

"U.S. Appl. No. 15/803,270, Notice of Allowance dated Oct. 30, 2020", 9 pgs.

"U.S. Appl. No. 14/072,690, Non Final Office Action dated Jun. 22, 2015", 11 pgs.

"U.S. Appl. No. 14/072,690, Response filed Sep. 16, 2015 to Non Final Office Action dated Jun. 22, 2015", 14 pgs.

"U.S. Appl. No. 14/072,690, Supplemental Amendment filed Sep. 16, 2015", 16 pgs.

"U.S. Appl. No. 14/072,690, Non Final Office Action dated Dec. 21, 2015", 16 pgs.

"U.S. Appl. No. 14/072,690, Response filed Mar. 16, 2016 to Non Final Office Action dated Dec. 21, 2015", 12 pgs.

"U.S. Appl. No. 14/072,690, Final Office Action dated Jun. 16, 2016", 13 pgs.

"U.S. Appl. No. 14/072,690, Response filed Aug. 8, 2016 to Final Office Action dated Jun. 16, 2016", 14 pgs.

"U.S. Appl. No. 14/072,690, Advisory Action dated Aug. 19, 2016", 2 pgs.

"U.S. Appl. No. 14/072,690, Non Final Office Action dated Dec. 29, 2016", 14 pgs.

"U.S. Appl. No. 14/072,690, Response filed Mar. 27, 2017 to Non Final Office Action dated Dec. 29, 2016", 22 pgs.

"U.S. Appl. No. 14/072,690, Final Office Action dated Jun. 28, 2017", 10 pgs.

"U.S. Appl. No. 14/072,690, Response filed Aug. 14, 2017 to Final Office Action dated Jun. 28, 2017", 11 pgs.

"U.S. Appl. No. 14/072,690, Applicant's Summary of Examiner Interview filed Sep. 1, 2017", 2 pgs.

"U.S. Appl. No. 14/072,690, Notice of Allowance dated Sep. 11, 2017", 6 pgs.

"U.S. Appl. No. 13/841,955, Preliminary Amendment filed Nov. 4, 2013", 5 pgs.

"U.S. Appl. No. 13/841,955, Non Final Office Action dated Dec. 24, 2014", 8 pgs.

"U.S. Appl. No. 13/841,955, Response filed Mar. 20, 2015 to Non Final Office Action dated Dec. 24, 2014", 17 pgs.

"U.S. Appl. No. 13/841,955, Final Office Action dated Jul. 16, 2015", 14 pgs.

"U.S. Appl. No. 13/841,955, Response filed Aug. 26, 2015 to Final Office Action dated Jul. 16, 2015", 19 pgs.

"U.S. Appl. No. 13/841,955, Non Final Office Action dated Sep. 4, 2015", 16 pgs.

"U.S. Appl. No. 13/841,955, Response filed Nov. 30, 2015 to Non Final Office Action dated Sep. 4, 2015", 19 pgs.

"U.S. Appl. No. 13/841,955, Final Office Action dated Mar. 10, 2016", 14 pgs.

"U.S. Appl. No. 13/841,955, Appeal Brief filed Jul. 7, 2016", 35 pgs.

"U.S. Appl. No. 13/841,955, Non Final Office Action dated Dec. 2, 2016", 15 pgs.

"U.S. Appl. No. 13/841,955, Response filed Feb. 23, 2017 to Non Final Office Action dated Dec. 2, 2016", 29 pgs.

"U.S. Appl. No. 13/841,955, Final Office Action dated Jun. 16, 2017", 17 pgs.

"U.S. Appl. No. 13/841,955, Response filed Aug. 16, 2017 to Final Office Action dated Jun. 16, 2017", 18 pgs.

"U.S. Appl. No. 13/841,955, Non Final Office Action dated Sep. 20, 2017", 16 pgs.

"U.S. Appl. No. 13/841,955, Response filed Dec. 18, 2017 to Non Final Office Action dated Sep. 20, 2017", 17 pgs.

"U.S. Appl. No. 13/841,955, Final Office Action dated Apr. 19, 2018", 17 pgs.

"U.S. Appl. No. 13/841,955, Response filed May 31, 2018 to Final Office Action dated Apr. 19, 2018", 18 pgs.

"U.S. Appl. No. 13/841,955, Advisory Action dated Jun. 14, 2018", 7 pgs.

"U.S. Appl. No. 13/841,955, Response filed Jul. 17, 2018 to Advisory Action dated Jun. 14, 2018", 17 pgs.

"U.S. Appl. No. 13/841,955, Non Final Office Action dated Sep. 10, 2018", 17 pgs.

"U.S. Appl. No. 13/841,955, Response filed Dec. 7, 2018 to Non Final Office Action dated Sep. 10, 2018", 27 pgs.

"U.S. Appl. No. 13/841,955, Notice of Allowance dated Apr. 5, 2019", 9 pgs.

"U.S. Appl. No. 13/841,955, 312 Amendment filed May 10, 2019", 8 pgs.

"U.S. Appl. No. 13/841,955, PTO Response to Rule 312 Communication dated May 24, 2019", 3 pgs.

* cited by examiner

PRIORITIZING ITEMS BASED ON USER ACTIVITY

BACKGROUND

The present invention relates to prioritizing items in a display, especially prioritizing items in a display based on a current user activity.

Search engines allow users to input search queries based on keywords into a search query field. The search engine searches online resources that match the keywords in the search query. The search results are delivered to the user as a listing of results. The results generally include a list of items. Often, the titles of the item, a link to the item's online location, and a short description showing the item's relevance to the keywords are displayed with the items. Some search engines select items to be included in the list based on the item's content and metadata tags. A hyperlink markup language (HTML) title tag of the items can be used as the title of the items in the list while the description tag is used for the short description.

BRIEF SUMMARY

A method for prioritizing items based on user activity includes determining a user interest based on a current user activity and prioritizing items in a list presented in a display based on the user interest.

A system for prioritizing items based on user activity includes a determination engine to determine a user interest based on a current user activity, an options engine to present prioritization options in a display, and a prioritization engine to prioritize items in a list presented in the display based on the user interest and the prioritization options.

A computer program product for prioritizing items based on user activity includes a tangible computer readable storage medium, the tangible computer readable storage medium having computer readable program code embodied therewith, the computer readable program code having program instructions that, when executed, causes a processor to identify keywords in an application involved with a current user activity, determine a user interest based on the keywords, present prioritization options in a display, and prioritize items in a list presented in the display based on the user interest and the prioritization options.

A method for prioritizing items based on user activity includes determining a user interest based on a current user activity where the current user activity may be an online collaboration activity with at least one collaborator and the user interest is based on group memberships shared with the at least one collaborator and prioritizing items in a list presented in a display based on the user interest.

A system for prioritizing items based on user activity includes a keyword identification engine to identify keywords in current user activity, a determination engine to determine a user interest based on the keywords, and a prioritization engine to prioritize items in a list presented in the display based on the user interest and the prioritization options.

DETAILED DESCRIPTION

The present specification describes a method and system for prioritizing items based on current user activity.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational out steps to be performed on the computer or other programmable apparatus to produce a computer implemented process such that the instructions which execute on the computer or other programmable apparatus provide steps for implementing the functions/acts specified in the flowchart and/or block diagram block or blocks.

Often, search results delivered to the user include a large amount of information. The large amounts of information can bury the search results of greatest interest to the user. This causes the user to spend a significant amount of time going through the search results to find the results that are the most interesting to the user. Additionally, due to the large volume of data, a user may overlook the search results most interesting to the user. For example, the user may be overwhelmed with search results when trying to find a particular social networking group or community. In other examples, the user can also be buried in information when searching for a contact through a social networking site. In yet other examples, the user may have difficulty finding documents or links to information of interest to the user when inputting search terms into a search browser.

The principles described herein can cause the items in the search results to be sorted in a manner that presents the most interesting items to the user first. The same method is also applied to web feeds or other content that is updated and delivered to the user. The principles described herein include a method for determining a user interest based on a current user activity and prioritizing items in a list presented in a display based on the user interest. The items in the list may be search results, web feed content, links, collaboration groups, other items, or combinations thereof.

Figure 1:
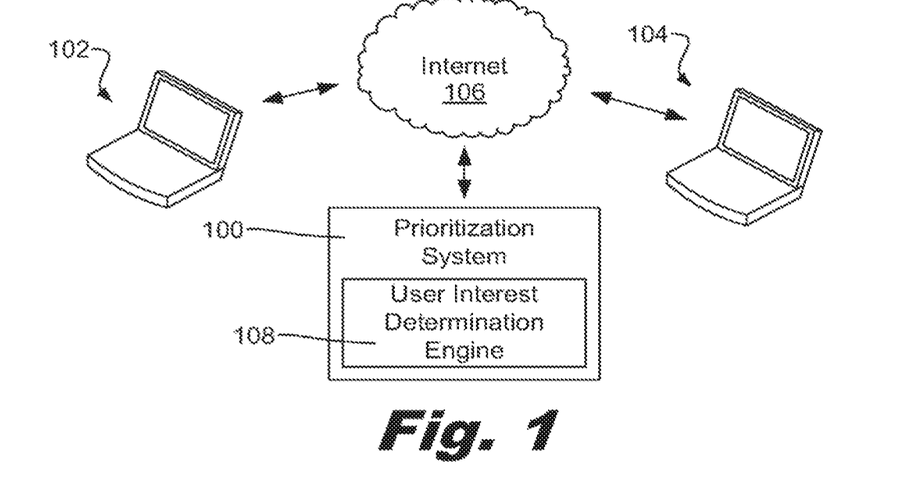
FIG. 1 is a diagram of an example of a prioritization system according to one example of the principles described herein.

Referring now to the figures, FIG. 1 is a diagram of an example of a prioritization system (100). In this example, the prioritization system (100) is in communication with a first client device (102) and a second client device (104) over an internet (106). The prioritization system (100) also includes a user interest determination engine (108).

The client device (102) may be any appropriate device that allows the user to access information from the internet. For example, the client device (102) may be a desktop, a laptop, a personal computer, a mobile device, a phone, an electronic tablet, another type of client device, or combinations thereof.

The prioritization system (100) sorts the order that items are presented to users in displays of the client devices (102, 104). The items may be part of search results from a search query, collaboration group search results from a collaboration group search, web feeds, news feeds, other items, or combinations thereof. The user may have an option to apply the prioritization system (100) to a selected list or a sub-list of items. In some examples, the option is to turn the prioritization system (100) on or off. In other examples, the option includes the ability to apply the prioritization system (100) to specific sets of items while excluding other sets of items.

The prioritization system (100) sorts the items based on a user interest determined with the user's current activity. The current user activity is the current activity that the user is performing when the prioritization system (100) orders the items in the list. The current user activity may be determined by looking at the applications that are currently running on the user's client device.

The items that are most relevant to the user's current activity can be listed first in the list of items. To be listed first in a list search results, a search result will have both terms that match the search query and also terms that match or are at least associated with the user's interest. For example, a search query for apples can return search results that include a link to caramel apples and another link to nutrition for apples. Such a search query may be inputted through a search browser, through a collaborative environment, another search application, or combinations thereof. If the user interest determination engine (106) determines that the user has a user interest for nutrition based on the user's current user activity, then the prioritization system (100) will prioritize the link to apple nutrition by ordering that link in front of the link to the caramel apples.

The current user activity can be determined by identifying applications that are currently being operated by the user. For example, if the client device (102) has a word processing program open, the prioritization system (100) can analyze a document open in the word processing program to determine the user interest. The current activity can also be determined as the current application in focus. The prioritization system (100) can identify keywords to determine the subject of the document. An analyzer may determine that the term "nutrition" or a word derived from the term "nutrition" is mentioned at a frequency above a frequency threshold for determining user interests. In such a situation, the user interest determination engine (108) can determine that the user has an interest in nutrition. Such a system provides the user with an ability to find search terms or content in web feeds that are relevant to what the user is actually working on in the moment. For example, a user may be writing a paper about nutrition and input a search query to find an answer to a question about apples pertaining to the paper's subject. The prioritization system (100) causes the search results about apple nutrition to be listed first. The search result to the apple's nutrition has a higher likelihood to answer the user's question, so the prioritization system (100) saves the user time because the user does not have to search through the rest of the items to find the answer.

Applications that may be used to determine a user's current activity include word processing programs, email programs, calendar artifacts, calendar agendas, collaboration programs, instant messaging programs, conferencing programs, other programs, or combinations thereof. In some examples, the programs are programs that are run on the user's client device. As a result, the prioritization system (100) can use information from just the client device to determine the user's interest. In other examples, the user may be participating in a group meeting through the client device. In such an example, the meeting may be orchestrated through a collaboration program that joins the user as a participant with other collaborators. In such examples, the prioritization system (100) may use programs that are currently operated on the client devices of the other participants to determine the user's current activity. For example, a user may be participating in a meeting through client device (102) with a collaborator through client device (104). The collaborator may operate an application on client device (104) that indicates the collaborator has an interest in a particular subject. As a result, when the user on client device (102) inputs a search query on client device (102), the prioritization system (100) uses the application run by the collaborator on client device (104) to prioritize the search results for the user on client device (102).

The prioritization system (100) may also use artifacts on the user's calendaring system to determine a user's interest. For example, the user's calendaring system may indicate that the user is currently in a meeting, which has an agenda attached. The user interest determination engine (108) may use the agenda to determine that the user's interest. For example, the meeting agenda may include information about Java programming. As a result, the user interest determination engine (108) may determine that the user has a current interest in Java programming during the time that calendar indicates that the user is attending the meeting.

Further, the user may operate a program that is run over the internet (106) on a server, on a data center, distributed over several network components, at a remote location, or combinations thereof to determine the user interest. While the examples above have been described with reference to specific mechanisms for determining a user interest based on a current user activity, any appropriate mechanisms for determining user interests based on current user activity may be used in accordance with the principles described herein. Further, while the examples above have been described with reference to specific applications to determine a current user activity, any appropriate application for determining a current user activity may be used in accordance with the principles described herein. Also, while the examples above have been described with reference to specific mechanisms to analyze the current user activity to determine the user's interests, any appropriate mechanisms may be used in accordance with the principles described herein.

Figure 2:
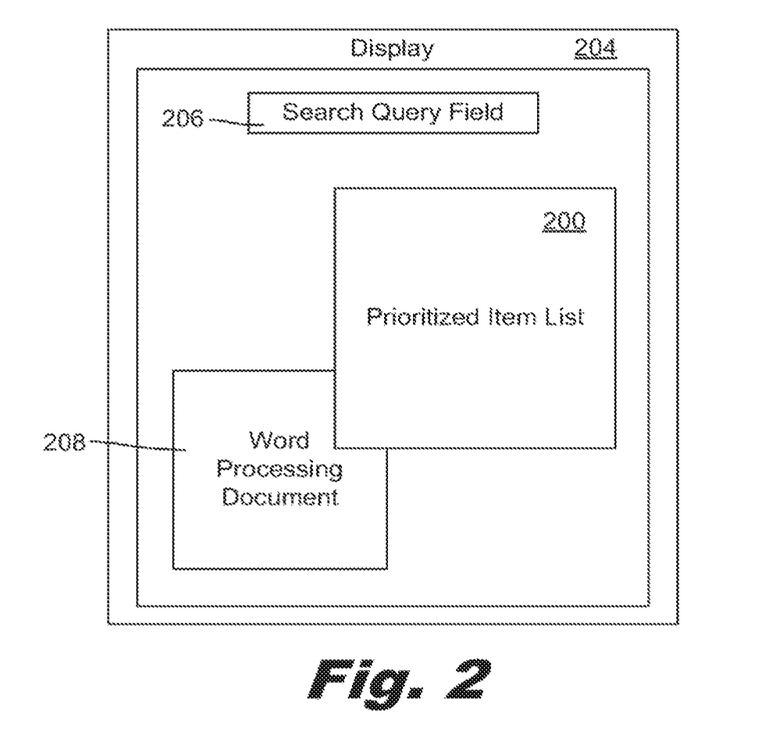
FIG. 2 is a diagram of an example of a list of prioritized items according to one example of the principles described herein.

FIG. 2 is a diagram of an example of a list (200) of prioritized items. In this example, the prioritized items are shown in a display (204) of a client device. A search query field (206) is available to the user to input a search query. Further, a word processing document (208) is displayed in the display (204), which indicates that a word processing program is operating on the client device.

A user may input a search term into the search query field (206). The prioritization system can analyze the word processing document (208) to determine a user interest. Based on the user interest derived from the open word processing document (208), the prioritization system will prioritize the search result items such that the items that both match the terms of the search query and are associated with the user's interests will be listed first in the list (200) of prioritized items.

In some examples, the prioritization system determines that the user has multiple interests. In such an example, the prioritization system may prioritize the items according to a prioritization policy. Such a prioritization policy may include factors that consider the relationship between the interests, the strength of the interests, the duration that the application has been running, how many applications are running on the user's client device, which of the applications running on the user's client device have been used most recently, other considerations, or combinations thereof.

In some situations, multiple applications are running on the client device concurrently. Each of the currently running applications may be used to determine current user interests.

The principles described herein may also assist a user in finding online collaboration groups. The user may find an online collaboration group of interest to the user quicker by using the prioritization system. The online collaboration group may be part of an online social networking site, another type of website, or combinations thereof. In some examples, the user interest may be determined by a social networking site that is running on a collaborator's client device. In such an example, the information in the user's social networking site's profile may be used to determine the user interest. Such information may include online collaboration group memberships of the collaborator, title information of the collaborator, interests of the collaborator, resume information of the collaborator, other information of the collaborator, or combinations thereof.

Figure 3:
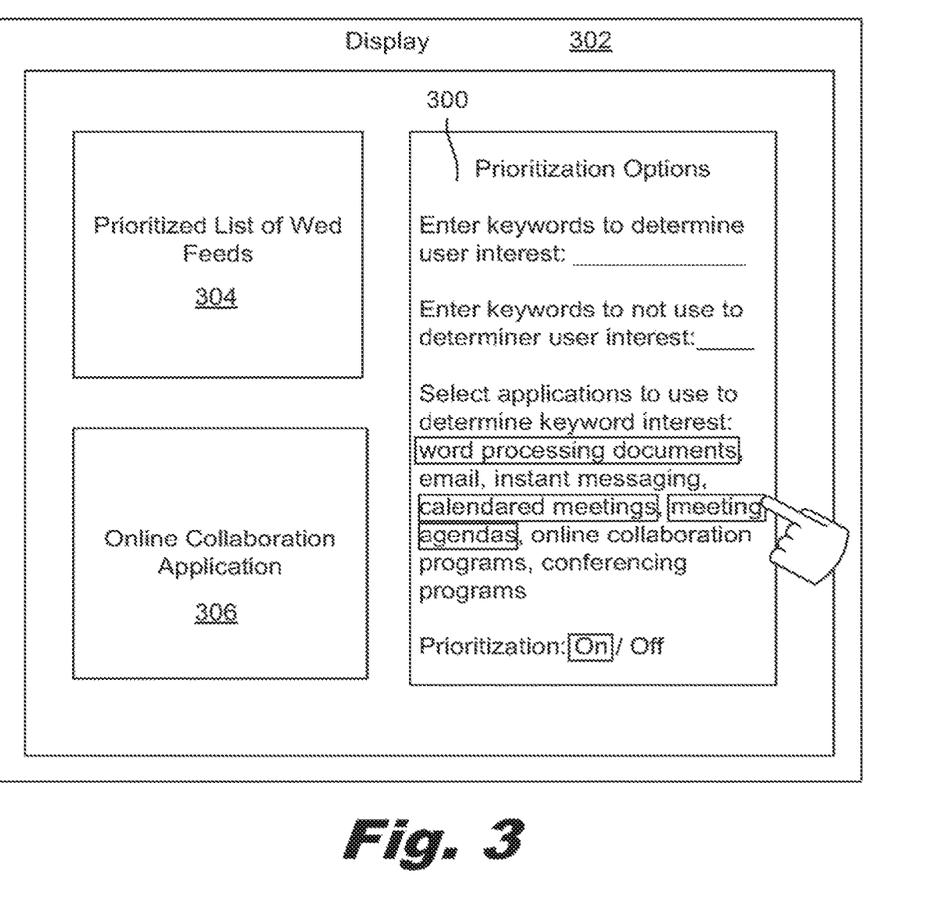
FIG. 3 is a diagram of an example of prioritization options according to one example of the principles described herein.

FIG. 3 is a diagram of an example of prioritization options (300). In this example, the prioritization options (300) are presented in a display (302) of a client device. The display (302) also displays web feeds (304), such as news feeds, and an online collaboration application (306).

The prioritization options (300) allow the user to customize his or her experience with the prioritization system. For example, the user may decide to turn off the prioritization system in circumstances where the user desires. Also, the prioritization system gives the user an option to determine which applications may be used to determine a user's interest. For example, the user may be working on a project that is easily derived from an operating word processing program, but the user may also be sending instant messages with a friend about a topic that is unrelated to the subject in the word processing document. In such a situation, the user may select an option to have the prioritization system to apply to the word processing document and not to the instant messaging program.

The user may have an option to select which keywords that the user wants to allow the prioritization system to use to determine a user interest. Additionally, the user may also have an option to disallow certain words from being used to determine the user's interests. In some cases, the prioritization system gives the user an option to define the meaning of keywords that can be used to determine the user's interest. For example, the user may indicate that the term "run" is to be understood as operating a computer program and not as a physical exercise. Further, the prioritization program may automatically determine that some words are not to be used to determine the user's interest. For example, words like "a," "the," "was," "is," other words, or combinations thereof can be automatically weeded out as words that will not assist with identifying the user's interest.

In the example of FIG. 3, the current user activity is based on the online collaboration application (306). In such an example, the user's interest may be determined by analyzing the keywords inputted by the user through the online collaboration application (306) or the words inputted by the collaborator through the online collaboration application (306). In other examples, the prioritization system may analyze the keywords from a current user activity on the collaborator's client device or from the collaborator's user profile. The prioritization options may give the user an option to exclude the applications running on the collaborator's client device from affecting the prioritization system for the user. In some example, the user has an option to prevent the prioritization system from allowing the applications on the user's client device from being used to determine the collaborator's current user activity. Thus, the user can ensure a level of privacy from the collaborator determining what the user is doing on the user's client device outside of the user's collaboration with the collaborator.

The prioritized items list in the display (302) is a list of items from a web feed (304), such as news feeds. The web feed (304) sends the user items that link to online content according to the web feed's subscription. For example, the user may have a web feed subscription to news about electronic tablets, and the web feed delivers items to the user's client device about online content that discusses the news pertaining to electronic tablets. In such an example, the user inputs no search query to have the items delivered to the user because the web feeds rely on the details of the user's web feed subscription to determine the items to send to the user. In such an example, the prioritization system causes the order of the web feed's items to be such that the web feeds that are related to the user's interests are ordered first in the list.

Figure 4:
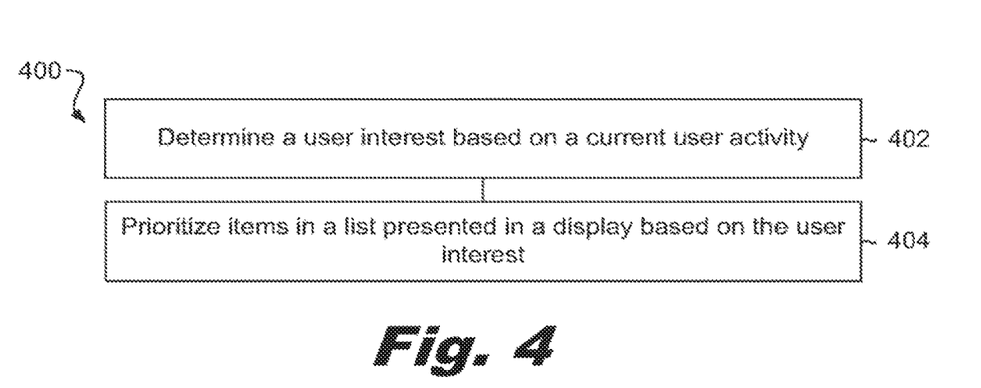
FIG. 4 is a diagram of an example of a method for prioritizing items based on user activity according to one example of the principles described herein.

FIG. 4 is a diagram of an example of a method (400) for prioritizing items based on the user's activity. In this example, the method (400) includes determining (402) a user interest based on a current user activity and prioritizing (404) items in a list presented in a display based on the user's interest.

The current user activity may be determined based on the application that is currently running on the user's client device. In other examples, the current user activity may be determined based on the applications that the user is accessing through the internet. Such a remote application may be an application that is being run by a server over a network. In some examples, the remote application is an application that is being operated on a client device of a collaborator.

Information from the collaborator's social application profile, group memberships, keyword frequency on an application run on the collaborator's client device, other information, or combinations thereof may be used to determine the user's interests. Also, the keyword frequency from applications run on the user's client device can be used to determine the user's interest. In some examples, multiple interests are determined. In such examples, the prioritization system determines which of the user interests to apply or how to weigh the user's interests.

Any appropriate application may be used to determine the user's current interests. For example, word processing programs, email programs, calendar artifacts, calendar agendas, collaboration programs, instant messaging programs, conferencing programs, other applications, or combinations thereof may be used to determine the user's interests.

In some examples, the prioritization system orders the items returned from a user's search query. The search query may be a search for online resources, information within a database, collaboration groups, other information, or combinations thereof. In other examples, the items are not delivered to the user in response to a search query. Such an example may include web feed links, news feed links, other links, or combinations thereof.

The user may also have an option to customize the parameters of the prioritization system. For example, the user may turn the prioritization system on or off, in whole or in part. Further, the user may select or deselect terms that can be used to determine the user's interest. Additionally, the user may select or deselect applications that can be used to determine the user's interest.

Figure 5:
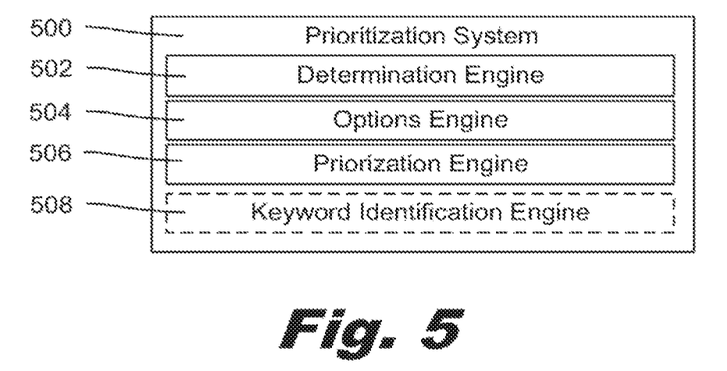
FIG. 5 is a diagram of an example of a prioritization system according to one example of the principles described herein.

FIG. 5 is a diagram of an example of a prioritization system (500). The prioritization system (500) has a determination engine (502), an options engine (504), and a prioritization engine (506). In this example, the prioritization engine (500) also has a keyword identification engine (508). The engines (502, 504, 506, 508) refer to a combination of hardware and program instructions to perform a designated function. Each of the engines (502, 504, 506, 508) may include a processor and memory. The program instructions are stored in the memory and cause the processor to execute the designated function of the engine.

The determination engine (502) determines the user's interests. The user's interest is determined by identifying a current user activity and then analyzing the current user activity to determine the user's current interest. The keyword identification engine (508) may be used to analyze the current user's activity by identifying keywords in an application currently being used by the user.

The options engine (504) gives the user options on how the prioritization system (500) is implemented. Such parameters may include whether the prioritization system is activated, the keywords used to determine an interest, the applications used to determine a user interest, what devices can be used to determine the user's interest, other parameters, or combinations thereof.

The prioritization engine (506) prioritizes items that are delivered to the user. For example, the prioritization engine (506) may prioritize items in search results, web feeds, other items, or combinations thereof. The prioritization engine (506) may cause the items that are related to the user's current interest to be listed first.

Figure 6:
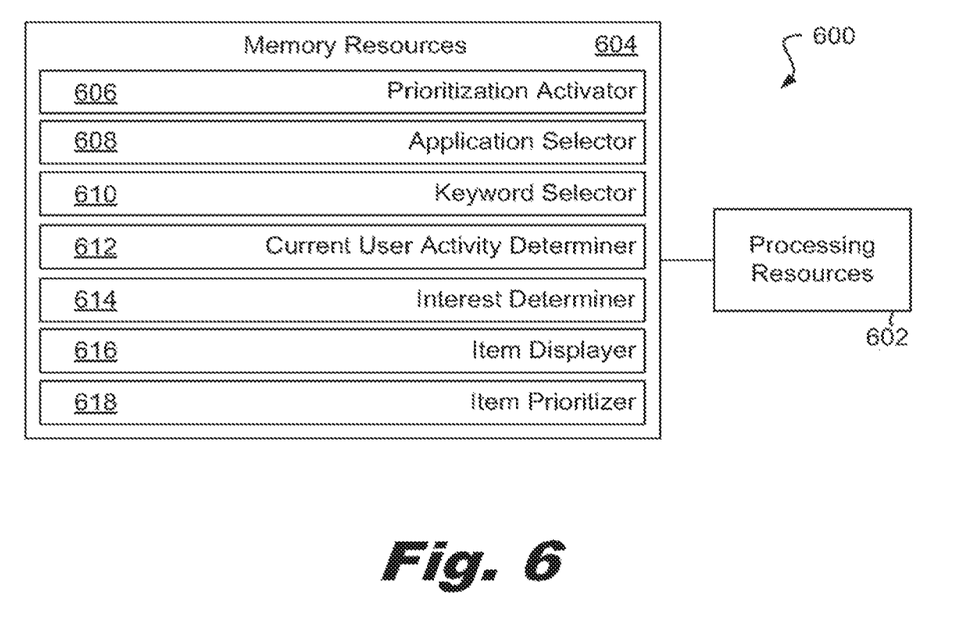
FIG. 6 is a diagram of an example of a prioritization system according to one example of the principles described herein.

FIG. 6 is a diagram of an example of a prioritization system (600). In this example, the prioritization system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the prioritization system (600). The programmed instructions shown stored in the memory resources (604) include a prioritization activator (606), an application selector (608), a keyword selector (610), a current user activity determiner (612), an interest determiner (614), an item displayer (616), and an item prioritizer (618).

The memory resources (604) include a computer readable storage medium that contains computer readable program code to cause tasks to be executed by the processing resources (602). The computer readable storage medium is a tangible storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic storage media, or types of memory, or combinations thereof.

The prioritization activator (606) represents programmed instructions that, when executed, cause the processing resources (602) to active the prioritization aspect of the prioritization system (600). The prioritization activator (606) may activate the prioritization aspect in response to the user selection an option to turn on the prioritization system.

The application selector (608) represents programmed instructions that, when executed, cause the processing resources (602) to select the applications that can be used to determine a user's current interest. The application selector (608) may determine which applications to use based on user input. The keyword selector (610) represents programmed instructions that, when executed, cause the processing resources (602) to select the applications that can be used to determine a user's current interest. The keyword selector (610) may determine which applications to use based on user input.

The current user activity determiner (612) represents programmed instructions that, when executed, cause the processing resources (602) to determine which of the applications selected by the application selector (608) are currently operating on the user's client device. The interest determiner represents programmed instructions that, when executed, cause the processing resources (602) to determine the current interests of the user based on the user's current activity and the keywords identified in the user's current activity.

The web feed displayer (616) represents programmed instructions that, when executed, cause the processing resources (602) to display a list of items. Such items may be from web feeds, search results, other types of items, or combinations thereof. The item prioritizer (618) represents programmed instructions that, when executed, cause the processing resources (602) to prioritize the items based on the user's current interests.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network.

Further, the data structures, such as the libraries and may be accessed from a remote location over a network connection while the programmed instructions are located locally. Thus, the prioritization system (600) may be implemented on a user device, on a server, on a collection of servers, or combinations thereof.

The prioritization system (600) of FIG. 6 may be part of a general purpose computer. However, in alternative examples, the prioritization system (600) is part of an application specific integrated circuit.

Figure 7:
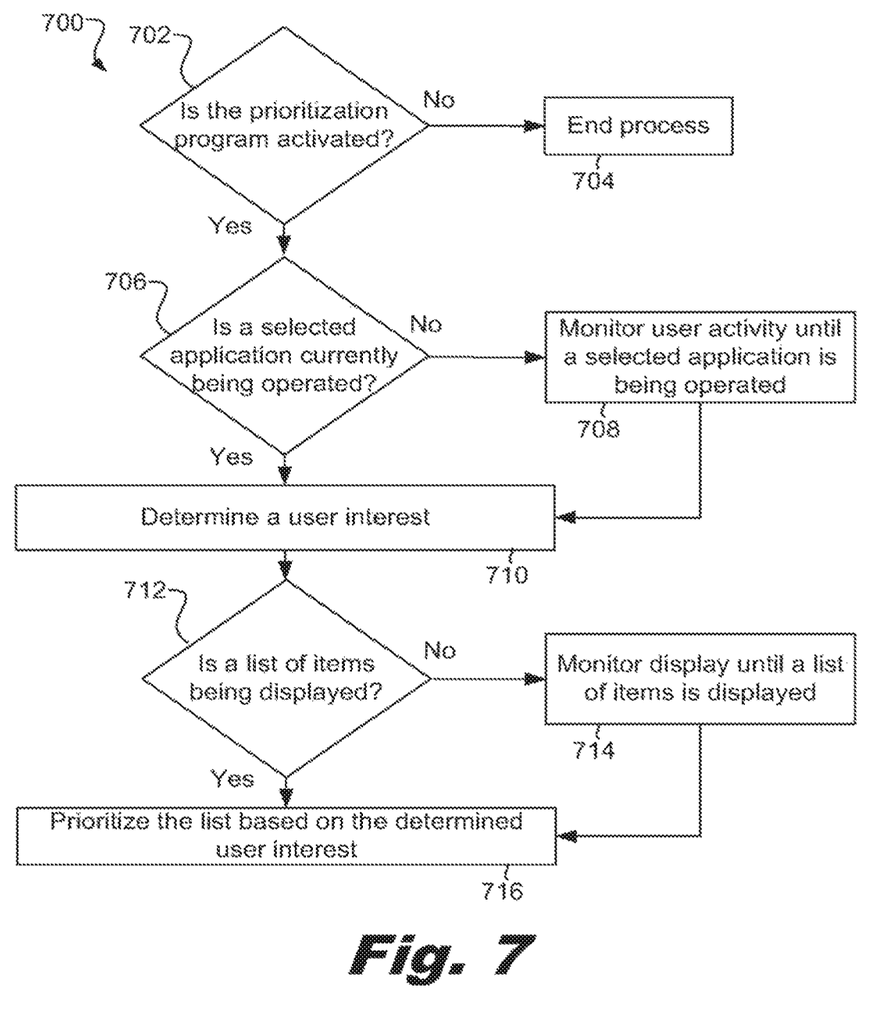
FIG. 7 is a diagram of an example of a flowchart of a process for prioritizing items based on user activity according to one example of the principles described herein.

FIG. 7 is a diagram of an example of a flowchart (700) of a process for prioritizing items based on user activity. In this example, the process includes determining (702) whether the prioritization system is activated. If the prioritization system is not activated, the process ends (704). The process also includes determining (706) whether an application selected to determine user interests is currently being operated. If such an application is not currently being operated, the process includes monitoring (708) the user's activity until a selected application is being operated. When a selected application is being operated, the user interest is determined (710) by analyzing the selected application.

The process also includes determining (712) whether a list of items is being displayed. If there is not a list of items being displayed, the display is monitored (714) until a list of items is displayed. When a list of items is displayed, the list is prioritized (716) based on the determined user interest.

While the examples above have been described with reference to specific mechanisms for determining a current user interest, any appropriate mechanisms for determining user interests may be used in accordance with the principles described herein. Further, while the examples above have been described with reference to specific applications that can be used on the client device, a server, or a collaborator's client device for determining the user's interest, any appropriate application may be used in accordance to the principles described herein. Also, while the examples above have been described with reference to specific types of items, any appropriate type of items may be used in accordance with the principles described herein. Additionally, while the examples above have been described with reference to specific prioritization options, any appropriate prioritization options may be used in accordance with the principles described herein.

The descriptions of the various examples of the present invention have been presented for purposes of illustration, but are not intended to be exhaustive or limited to the examples disclosed. Many modifications and variations will be apparent to those of ordinary skill in the art without departing from the scope and spirit of the described examples. For example, the sequence of tasks performed in a method may be performed in an appropriate manner that brings about the intended purpose of such a method. The terminology used herein was chosen to best explain the principles of the examples, the practical application or technical improvement over technologies found in the marketplace, or to enable others of ordinary skill in the art to understand the examples disclosed herein.

What is claimed is:

1. A method for prioritizing search query results based on applications executing on a device, the method comprising:
    receiving, via a user interface presented on a device, a search query comprising a first set of keywords;
    identifying a set of search query results based on the first set of keywords;
    identifying a first application being executed by the device and involved with a current user activity;
    extracting a second set of keywords from the first application;
    determining a ranking for the set of search query results based on the second set of keywords; and
    causing presentation of at least a subset of the set of search query results on a display of the device based on the ranking.

2. The method of claim 1, wherein the first application is one of a word processing program, an email program, a calendar artifact, a calendar agenda, a collaboration program, an instant messaging program and a conferencing program.

3. The method of claim 1, further comprising:
    causing presentation of a prompt by the device, the prompt enabling a user of the device to define a meaning of any of keywords from the second set of keywords.

4. The method of claim 1, further comprising:
    identifying a second application being executed by the device; and
    extracting a third set of keywords from the second application, wherein the ranking for the set of search query results is further based on the third set of keywords.

5. The method of claim 4, wherein the second application is one of a word processing program, an email program, a calendar artifact, a calendar agenda, a collaboration program, an instant messaging program and a conferencing program.

6. The method of claim 1, further comprising:
    receiving, via a second user interface presented on a second device, a second search query comprising a third set of keywords;
    identifying a second set of search query results based on the third set of keywords;
    identifying a second application being executed by the second device and involved with a current user activity;
    extracting a fourth set of keywords from the second application;
    determining a second ranking for the second set of search query results based on the fourth set of keywords; and
    causing presentation of at least a subset of the second set of search query results on a display of the second device based on the second ranking.

7. The method of claim 1, wherein determining the ranking for the set of search query results based on the second set of keywords comprises:
    for each respective search query result in the set of search query results, determining a number of keywords in the second set of keywords that occur in the respective search query result, yielding a set of keyword occurrence numbers; and
    ranking the set of search query results based on the set of keyword occurrence numbers.

8. A system comprising:
    one or more computer processors; and
    one or more computer-readable mediums storing instructions that, when executed by the one or more computer processors, cause the system to perform operations comprising:
    receiving, via a user interface presented on a device, a search query comprising a first set of keywords;
    identifying a set of search query results based on the first set of keywords;
    identifying a first application being executed by the device and involved with a current user activity;
    extracting a second set of keywords from the first application;
    determining a ranking for the set of search query results based on the second set of keywords; and
    causing presentation of at least a subset of the set of search query results on a display of the device based on the ranking.

9. The system of claim 8, wherein the first application is one of a word processing program, an email program, a calendar artifact, a calendar agenda, a collaboration program, an instant messaging program and a conferencing program.

10. The system of claim 8, the operation further comprising:
    causing presentation of a prompt by the device, the prompt enabling a user of the device to define a meaning of any keywords from the second set of keywords.

11. The system of claim 8, the operations further comprising:
    identifying a second application being executed by the device; and
    extracting a third set of keywords from the second application, wherein the ranking for the set of search query results is further based on the third set of keywords.

12. The system of claim 11, wherein the second application is one of a word processing program, an email program, a calendar artifact, a calendar agenda, a collaboration program, an instant messaging program and a conferencing program.

13. The system of claim 8, the operations further comprising:
    receiving, via a second user interface presented on a second device, a second search query comprising a third set of keywords;
    identifying a second set of search query results based on the third set of keywords;
    identifying a second application being executed by the second device and involved with a current user activity;
    extracting a fourth set of keywords from the second application;
    determining a second ranking for the second set of search query results based on the fourth set of keywords; and
    causing presentation of at least a subset of the second set of search query results on a display of the second device based on the second ranking.

14. The system of claim 8, wherein determining the ranking for the set of search query results based on the second set of keywords comprises:
    for each respective search query result in the set of search query results, determining a number of keywords in the second set of keywords that occur in the respective search query result, yielding a set of keyword occurrence numbers; and
    ranking the set of search query results based on the set of keyword occurrence numbers.

15. A non-transitory computer-readable medium storing instructions that, when executed by one or more computer processors of one or more computing devices, cause the one or more computing devices to perform operations comprising:
- receiving, via a user interface presented on a device, a search query comprising a first set of keywords;
- identifying a set of search query results based on the first set of keywords;
- identifying a first application being executed by the device and involved with a current user activity;
- extracting a second set of keywords from the first application;
- determining a ranking for the set of search query results based on the second set of keywords; and
- causing presentation of at least a subset of the set of search query results on a display of the device based on the ranking.

16. The non-transitory computer-readable medium of claim 15, wherein the first application is one of a word processing program, an email program, a calendar artifact, a calendar agenda, a collaboration program, an instant messaging program and a conferencing program.

17. The non-transitory computer-readable medium of claim 15, the operation further comprising:
- causing presentation of a prompt by the device, the prompt enabling a user of the device to define a meaning of any keywords from the second set of keywords.

18. The non-transitory computer-readable medium of claim 15, the operations further comprising:
- identifying a second application being executed by the device; and
- extracting a third set of keywords from the second application, wherein the ranking for the set of search query results is further based on the third set of keywords.

19. The non-transitory computer-readable medium of claim 15, the operations further comprising:
- receiving, via a second user interface presented on a second device, a second search query comprising a third set of keywords;
- identifying a second set of search query results based on the third set of keywords;
- identifying a second application being executed by the second device and involved with a current user activity;
- extracting a fourth set of keywords from the second application;
- determining a second ranking for the second set of search query results based on the fourth set of keywords; and
- causing presentation of at least a subset of the second set of search query results on a display of the second device based on the second ranking.

20. The non-transitory computer-readable medium of claim 15, wherein determining the ranking for the set of search query results based on the second set of keywords comprises:
- for each respective search query result in the set of search query results, determining a number of keywords in the second set of keywords that occur in the respective search query result, yielding a set of keyword occurrence numbers; and
- ranking the set of search query results based on the set of keyword occurrence numbers.

\* \* \* \* \*